United States Patent [19]
Numata et al.

[11] Patent Number: 5,518,166
[45] Date of Patent: May 21, 1996

[54] ASSEMBLING METHOD OF PRODUCTS AND ASSEMBLING APPARATUS OF THE SAME

[75] Inventors: Takumi Numata; Kimitaka Ogata; Hideki Tamura, all of Hiroshima, Japan

[73] Assignee: Kurata Corporation, Hiroshima, Japan

[21] Appl. No.: 338,091

[22] Filed: Nov. 9, 1994

[51] Int. Cl.$^6$ .......................... B23K 37/047; B23P 21/00
[52] U.S. Cl. ...................... 228/182; 228/6.1; 228/49.6; 29/430
[58] Field of Search ........................ 228/4.1 A, 6.1 A, 228/49.1, 49.6, 182, 213; 29/430

[56] References Cited

U.S. PATENT DOCUMENTS

| | | | |
|---|---|---|---|
| 4,483,476 | 11/1984 | Fujikawa et al. | 228/49.6 |
| 5,226,584 | 7/1993 | Numata et al. | 228/182 |
| 5,347,700 | 9/1994 | Tominaga et al. | 228/49.6 |

FOREIGN PATENT DOCUMENTS

| | | |
|---|---|---|
| 0446518 | 9/1991 | European Pat. Off. . |
| 2133749 | 8/1994 | United Kingdom . |

*Primary Examiner*—Kenneth J. Ramsey
*Attorney, Agent, or Firm*—Sixbey, Friedman, Leedom & Ferguson; Gerald J. Ferguson, Jr.

[57] ABSTRACT

In an assembly line of a vehicle body W, vehicle body parts differentiated in accordance with the vehicle body type are clamped on respective carriages travelling on an assembly line 1 for sequentially executing temporary welding and power-increased welding for assembling the vehicle body W. An exclusive carriage 3A (3B), clamping parts of the vehicle body W in position for temporary welding, causes a reciprocative movement between a part-supplying station S1 and a temporary welding station S2. A common carriage 10A carrying the vehicle body W causes a reciprocative movement between the temporary welding station S2 and a power-increased welding station S3. Welding robots 29, 29 of the temporary welding station S2 perform the temporary welding for connecting the parts clamped in position on the exclusive carriage 3A (3B). Thus temporarily welded body assembly is lifted and transferred onto a side rotary jig 24 and supported in position for power-increased welding. In a power-increased station S3, the parts are transferred from the common carriage 10A onto a side rotary jig 31 and supported in position for power-increased welding by welding robots 32, 32. Accordingly, a circulation type transportation system is no longer necessary. Thus, a mixed assembly line capable of assembling plural types of under bodies W, W can be realized with small installation space.

12 Claims, 14 Drawing Sheets

ASSEMBLING METHOD OF PRODUCTS AND ASSEMBLING APPARATUS OF THE SAME

BACKGROUND OF THE INVENTION

The present invention relates to an assembling method of products and an assembling apparatus of the same, and more particularly to a mixed production system for automotive vehicles capable of producing numerous types of vehicle bodies or vehicle body parts.

Conventionally known as this kind of vehicle body assembling apparatus is the one having a circulation type transportation system wherein a plurality of carriages carrying vehicle body parts clamped by jigs are circulated along a loop-shaped transportation line and welding is carried out in a condition where the parts are laid on each carriage. More specifically, the parts are welded in predesignated stations of the assembly line for temporary and power-increased (i.e. permanent) welding steps. After finishing these welding steps, the carriage carrying the parts is transported to the next station for conducting the next step. When all the steps are finished and therefore a vehicle body is completed at the final station, the completed vehicle body is taken out of its carriage and then the carriage becoming empty at this moment is returned to the first station of the assembly line via a recovery line.

However, the jigs used for clamping parts in position are generally complicated in their configuration. Therefore, such a conventional circulation type transportation system encounters with a problem of interference caused between a welding equipment and the jigs when power-increased welding is applied to the parts laid on the carriage. In fact, conducting the power-increased welding is not feasible because of this kind of interference. Furthermore, due to complicatedness of the jigs, the circulation type transportation system will require a fairly large space and equipment, accompanying increase of cost. Hence, the temporary welding step must be separated from the power-increased welding step. In other words, the conventional circulation type assembly line requires to build an additional or exclusive line of a non-circulation type dedicated to the separated temporary welding step.

Meanwhile, as the power-increased welding step requiring transportation of carriage is carried out by the circulation type transportation system, it will inevitably require a large scale equipment and high cost or a large installation space.

SUMMARY OF THE INVENTION

Accordingly, in view of above-described problems encountered in the prior art, a principal object of the present invention is to change the fundamental construction of carriages and the way of their transportation thereby generalizing all the temporary and permanent connection steps for a mixed assembling of plural types products, as well as eliminating the circulation type carriage transportation system for realizing space reduction and cost reduction.

In order to accomplish this and other related objects, the present invention basically allows a carriage to cause a reciprocative movement only in a region between adjacent two stations. A plurality of carriages are separated into two groups, one being common carriages having common jigs commonly used for clamping parts constituting plural types of products, and the other being exclusive carriages having exclusive jigs exclusively used for each of the plural types of products. The exclusive carriages, each configured differently in accordance with product type, are capable of cause a reciprocative movement between two stations located upstream of the assembly line. Meanwhile, the common carriages, each having the same configuration irrespective of product type, are capable of cause a reciprocative movement between two stations located downstream of the assembly line.

A first aspect of the present invention provides an assembling method for assembling plural types of products by using carriages travelling on an assembly line, the assembling method comprising steps of:

preparing plural types of exclusive carriages differentiated in accordance with product type, each including exclusive jigs clamping parts constituting a product in position for temporary connection, and at least one common carriage including common jigs having common configuration irrespective of product type;

using a carriage supply apparatus for conveying one of the plural types of exclusive carriages to a part-supplying station of the assembly line;

supplying parts of a product onto the one of plural types of exclusive carriages and using the exclusive jigs for clamping parts supplied;

transporting the exclusive carriage to a temporary connecting station and temporarily connecting the parts, and subsequently transferring the parts from the exclusive carriage to a first positioning means and supporting the parts in position for permanent connection;

connecting a part of the parts permanently, and then transferring the parts from the first positioning means onto the common carriage and clamping the parts by means of the common jigs; and transporting the common carriage to at least one permanent connecting station wherein the parts are transferred from the common carriage to a second positioning means and clamping the parts in position for completing the permanent connection of the parts.

A second aspect of the present invention provides an assembling apparatus for assembling plural types of products by using carriages travelling on an assembly line the assembling apparatus comprising:

plural types of exclusive carriages differentiated in accordance with product type, each including exclusive jigs clamping parts constituting a product in position for temporary connecting;

at least one common carriage including common jigs having common configuration irrespective of product type;

carriage supply means for transporting one of the plural types of exclusive carriages to the assembly line;

a part-supplying station, disposed in the assembly line, for supplying parts to the exclusive carriage conveyed by the carriage supply means, and clamping the parts in position by means of the exclusive jigs;

a temporary connecting station disposed downstream of the part-supplying station in the assembly line and having a first positioning means for supporting the parts in position, the temporary connecting station temporarily connecting the parts clamped in position on the exclusive carriage and transferring temporarily welded parts from the exclusive carriage to the first positioning means to execute partial permanent connection of the parts, and thereafter transferring the parts from the first positioning means to the common carriage to clamp the parts in position by means of the common jigs; and at least one permanent connecting station disposed downstream of the temporary connecting station in the assembly line and having a second positioning means for supporting the parts in position, the permanent connecting station transferring the parts from the common carriage to the second positioning means to complete permanent connection of the parts.

It is preferable in accordance with the above assembling apparatus that the exclusive carriage returns to the part-supplying station immediately after the parts temporarily connected in the temporary connection station is transferred onto the first positioning means, while the common carriage returns to a station located upstream of the permanent connecting station immediately after the parts permanently connected in the permanent connecting station is transferred onto the second positioning means.

It is further preferable that the carriage supply means has a plurality of carriage containers accommodating plural types of exclusive carriages and disposed along the assembly line, and the carriage supply means selectively supplies the assembly line with any one of the exclusive carriages from its corresponding carriage container.

It is also preferable that the carriage supply means has a turning table on which a plurality of carriage containers accommodating plural types of exclusive carriages are disposed in a circumferential direction, and the carriage supply means turns the turning table so that one carriage container is located at a position meeting the assembly line, thereby supplying one exclusive carriage from its carriage container to the assembly line.

It is still further preferable that the carriage supply means has an elevation means supporting a plurality of carriage containers accommodating plural types of exclusive carriages shiftable in a vertical direction, and the carriage supply means causes the elevation means to vertically shift so that one carriage container is positioned at a height meeting the assembly line, thereby supplying one exclusive carriage from the carriage container to the assembly line.

Furthermore, it is preferable that the positioning means includes support bases standing at both sides of the assembly line, each support base having a top provided with a shaft parallel to a longitudinal direction of the assembly line, the shaft rotatably supporting plural types of support arms configured differently in accordance with product type, wherein same type support arms of the support bases disposed at both sides of the assembly line are fixed in a confronting position protruding horizontally toward the assembly line, and cooperatively support the product in position.

Furthermore, it is preferable that the exclusive carriages and common carriage are equipped with a lifter for raising the parts laid on the carriage up to a height of the support arms of the positioning means.

The product of the present invention may include a vehicle body or vehicle body parts.

The assembly line of the present invention may include a plurality of station groups each combining the part-supplying station, the temporary connecting station and the permanent connecting station are provided in the assembly line.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Hereinafter, preferred embodiments of the present invention will be explained in greater detail with reference to the accompanying drawings.

Figure 1:
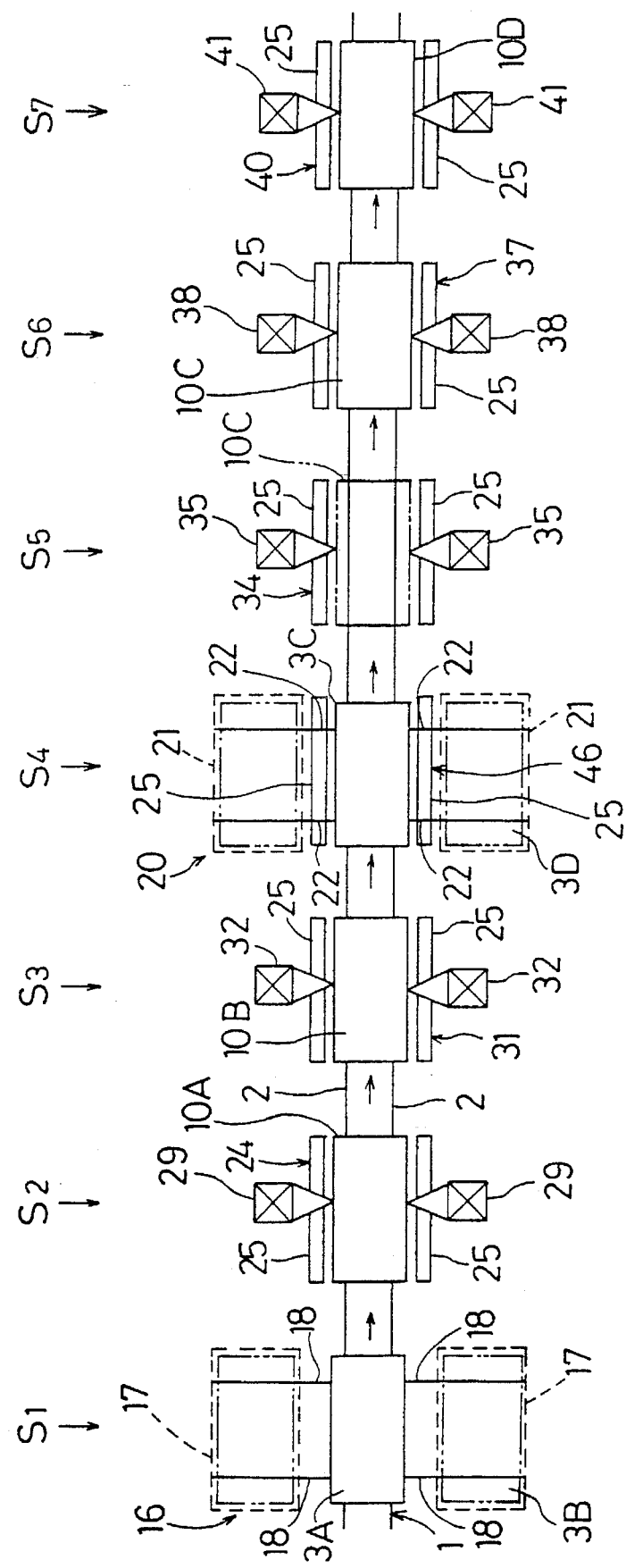
FIG. 1 is a plan view schematically showing a layout of a vehicle body assembly line in accordance with a preferred embodiment of the present invention.
Figure 2:
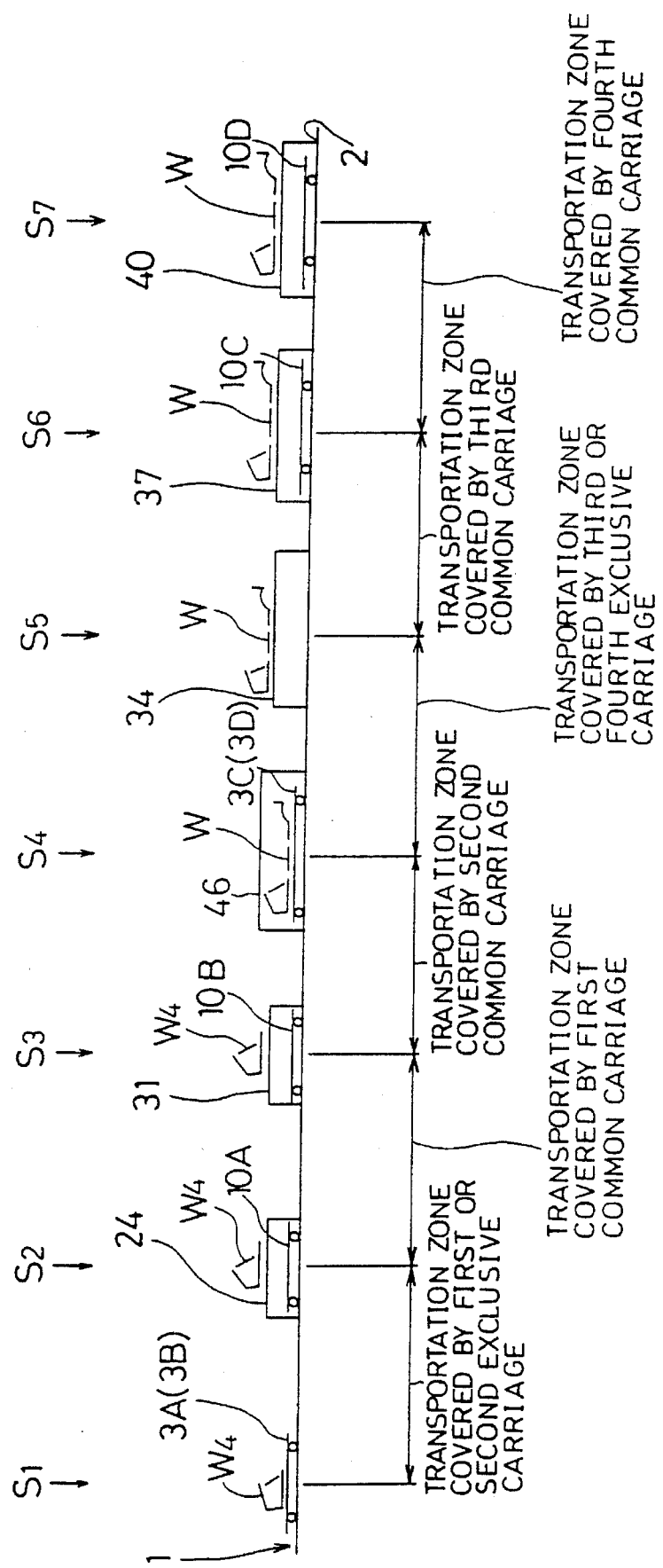
FIG. 2 is a front view schematically showing the layout of the vehicle body assembly line of FIG. 1.
Figure 11B:
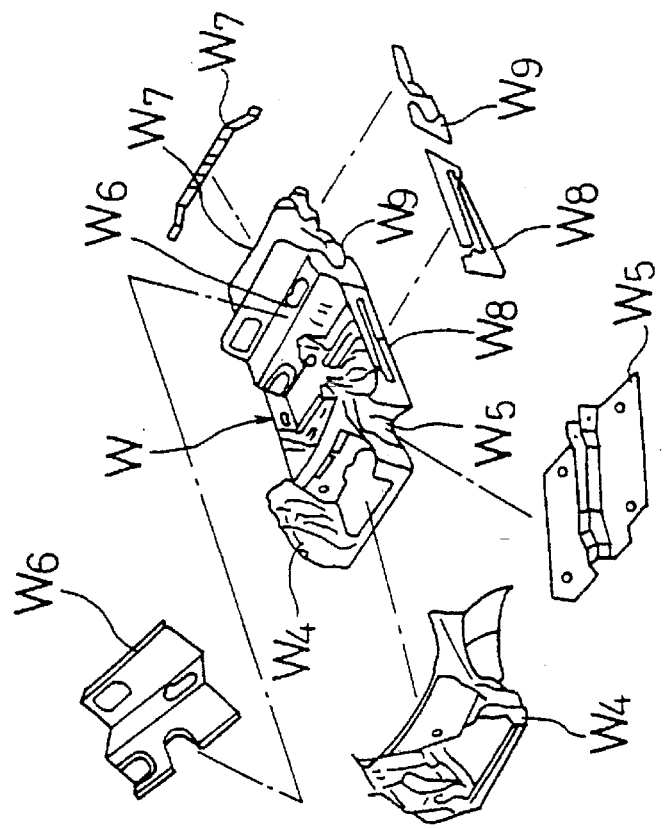
FIGS. 11(a) and 11(b) are perspective views schematically showing vehicle body parts to be assembled.
Figure 11A:
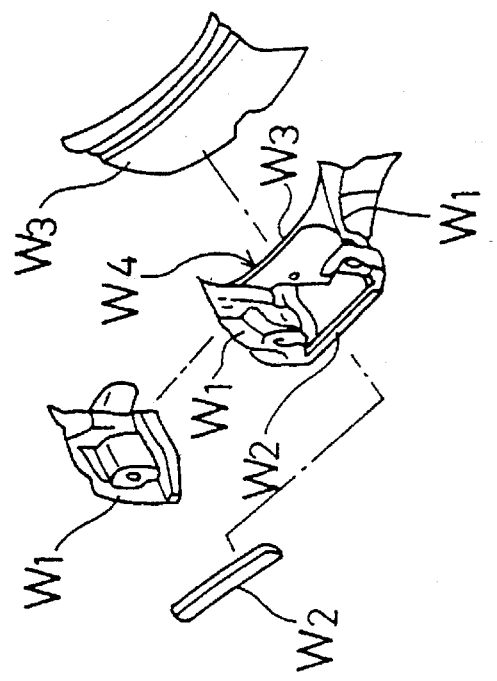
Figure 12:
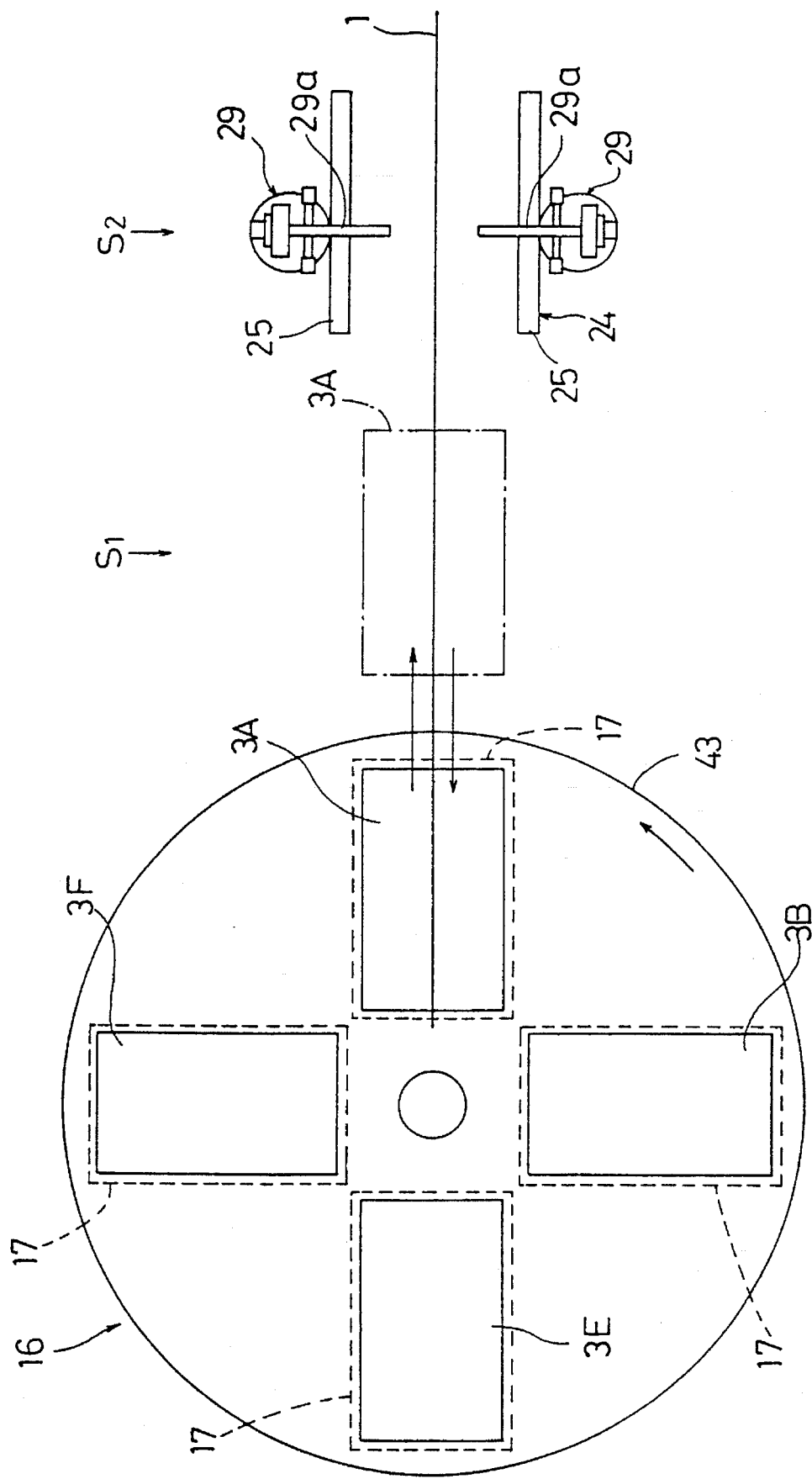
FIG. 12 is a plan view schematically showing a modification of the carriage supply apparatus.

FIG. 1 is a plan view schematically showing a vehicle body assembly line in accordance with a preferred embodiment of the present invention, and FIG. 2 is a front view schematically showing this vehicle body assembly line. Parts to be spot welded in this vehicle body assembly line are two different kinds of under bodies W, W which include various parts mainly constituting the under part of a vehicle body other than a roof and pillars. More specifically, as illustrated in FIG. 11, each under body W basically includes right and left front fenders W1, W1, a front cross member W2, a dash panel W3 and others constituting a front body assembly W4 which is to be further connected with front and rear floor panels W5, W6, a rear end panel W7, and front and rear side sills W8, W9. Although not shown, all or a part of the parts constituting one under body W are differentiated in accordance with the type of a vehicle.

In FIGS. 1 and 2, a reference numeral 1 represents an assembly line of the under body W which flows right in the drawing. The assembly line 1 includes right and left rails 2, 2, on which carriages 3A–3D and 10A–10D later described are transported. Sequentially provided along the assembly line 1 from the upstream thereof to downstream thereof are seven stations consisting of a first part-supplying station S1, a first temporary welding station S2 (temporary connecting station), a first power-increased welding station S3 (permanent connecting station), a second part-supplying station S4, a second temporary welding station S5 (temporary connecting station), and second and third power-increased welding stations S6 and S7 (permanent connecting stations). As illustrated in FIG. 2, a first exclusive carriage 3A or a second exclusive carriage 8B is capable of causing a reciprocative movement between the first part-supplying station S1 and the first temporary welding station S2, while a third exclusive carriage 3C or a fourth exclusive carriage 3D is capable of causing a reciprocative movement between the second part-supplying station S4 and the second temporary welding station S5.

Furthermore, a first common carriage 10A is capable of causing a reciprocative movement between the first temporary welding station S2 and the first power-increased welding station S3. A second common carriage 10B is capable of causing a reciprocative movement between the first power-increased welding station S3 and the second part-supplying station S4. A third common carriage 10C is capable of causing a reciprocative movement between the second temporary welding station S5 and the second power-increased welding station S6. And, a fourth common carriage 10D is capable of causing a reciprocative movement between the second and third power-increased welding stations S6 and S7.

Figure 9:
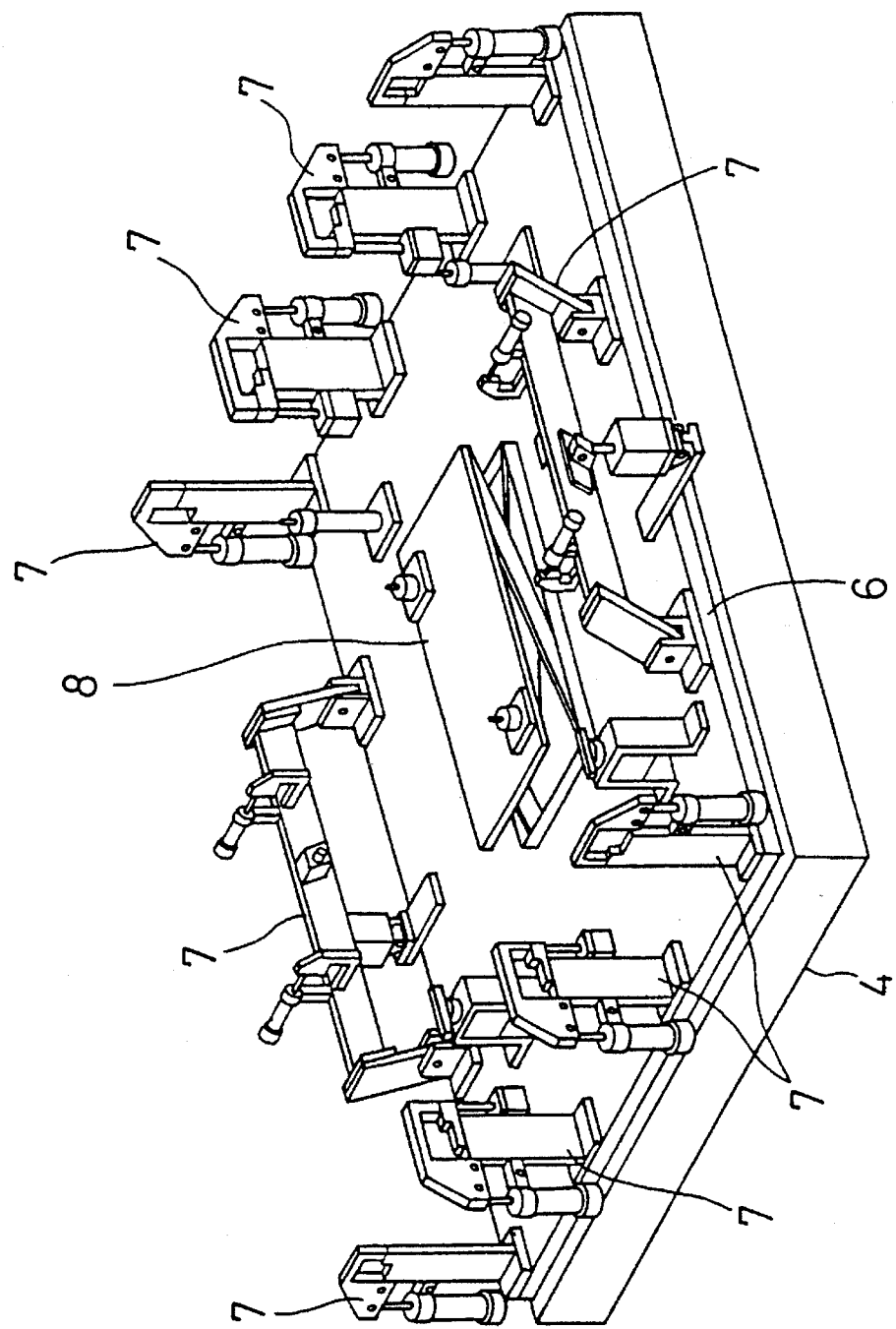
FIG. 9 is an enlarged perspective view showing one example of the exclusive carriage.
Figure 10:
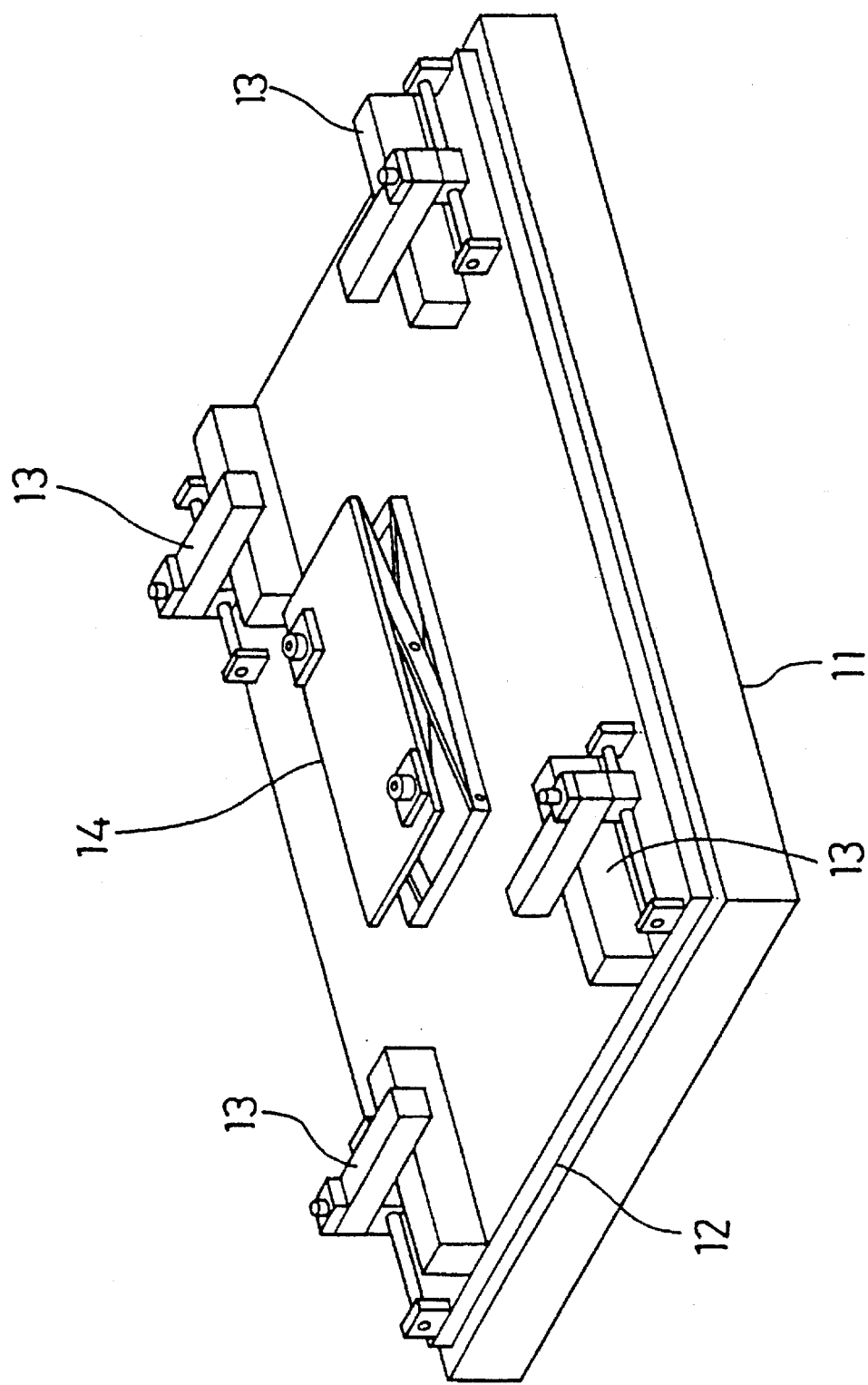
FIG. 10 is an enlarged perspective view showing one example of the common carriage.

The first to fourth exclusive carriages 3A–3D have essentially the same construction, although including differently configured portions corresponding to the parts differentiated between the two different types of under bodies W and W. The first exclusive carriage 3A will be explained as a representative of the four exclusive carriages 3A–3D, while identical parts as those of the exclusive carriage 3A will be denoted by the same reference numerals in other exclusive carriages 3B–3D. The first exclusive carriage 3A, as illustrated in FIG. 9, includes a rectangular carriage body 4 with four corners supported by wheels 5, - - - ,5 (refer to FIG. 6) travelling on the rails 2, 2 of the assembly line 1. On the carriage body 4, there is provided a jig base 6 having the same rectangular shape as the carriage body 4 and integrally fixed to the carriage body 4. Standing on the jig base 6 along a periphery thereof are plural kinds of exclusive jigs 7, - - - ,7 respectively clamping a part of the under body W for temporarily positioning it in accordance with the type of the under body W. Installed at a center of the jig base 6 is a lifter 8 which can elevate the under body W up to the height of support arms 26, 26 of a side rotary jig 24 (later described) cooperatively receiving the under body The first to fourth common carriages 10A–10D have a simple function of mainly transporting the under body W, and have essentially the same construction. The first common carriage 10A will be explained as a representative of these four common carriages 10A–10D, while identical parts as those of the exclusive carriage 10A will be denoted by the same reference numerals in the second to forth common carriages 10B–10D. The first common carriage 10A, as illustrated in FIG. 10, includes a rectangular carriage body 11 with four corners supported by wheels (not shown) travelling on the rails 2, 2 of the assembly line 1. On the carriage body 11, there is provided a jig base 12 having the same rectangular shape as the carriage body 11 and integrally fixed to the carriage body 11. Provided on the jig base 12 at the four corners thereof are four common jigs 13, - - - ,18 respectively clamping a common part of the under body W for holding it irrespective of the type of the under body W. Installed at a center of the jig base 12 is a lifter 14 which can elevate the under body W up to the height of support arms 26, 26 of the side rotary jig 24 or 31 (later described) cooperatively receiving the under body W.

As illustrated in FIGS. 1 and 2, there is provided a first carriage supply apparatus 16 which supplies the first part-supplying station S1 of the assembly line 1 with one of the first exclusive carriage 3A and the second exclusive carriage 3B which are differentiated in accordance with the type of a vehicle. This first carriage supply apparatus 16 includes a pair of carriage containers 17, 17 disposed at both right and left sides of the first part-supplying station S1. The first and second exclusive carriages 3A and 3B are accommodated in these carriage containers 17, 17, respectively. Each of the carriage containers 17, 17 is connected to the assembly line 1 via a pair of access rails 18, 18. Hence, the exclusive carriages 3A and 3B are capable of causing a reciprocative movement between the carriage containers 17, 17 and the assembly line 1. Thus, the exclusive carriages 3A and 3B are selectively supplied from respective carriage containers 17, 17 to the assembly line 1 via the access rails 18, 18.

Moreover, there is provided a second carriage supply apparatus 20 which selectively supplies the second part-supplying station S4 with the third exclusive carriage 3C or the fourth exclusive carriage 3D. This second carriage supply apparatus 20 is similar to the first carriage supply apparatus 16. This second carriage supply apparatus 20 includes a pair of carriage containers 21, 21 disposed at both right and left sides of the second part-supplying station S4. The third and fourth exclusive carriages 3C and 3D are accommodated in these carriage containers 21, 21, respectively. Each of the carriage containers 21, 21 is connected to the assembly line 1 via a pair of access rails 22, 22. Hence, the exclusive carriages 3C and 3D are capable of causing a reciprocative movement between the carriage containers 21, 21 and the assembly line 1. Thus, the exclusive carriages 3C and 3D are selectively supplied from respective carriage containers 21, 21 to the assembly line 1 via the access rails 22, 22.

Detailed operations performed in the above-described seven stations S1 to S7 are as follows.

First part-supplying station S1

First, the exclusive carriage 3A (or 3B) is supplied from the first carriage supply apparatus 16 to this first part-supplying station S1. Then, parts constituting the front body assembly W4 shown in FIG. 11(a), such as the right and left front fenders W1, W1, the front cross member W2, and the dash panel W3, are supplied and workers of the first part-supplying station S1 set these parts in position on the exclusive carriage 3A (or 3B). Among these parts, exclusive parts differentiated in accordance with the type of a vehicle are clamped by the exclusive jigs 7, - - - ,7 on the jig base 6.

First temporary welding station S2

The first temporary welding station S2 includes the first side rotary jig 24 acting as a first positioning means for clamping parts of the front body assembly W4 in position for temporarily welding the parts of the front body assembly W4 in accordance with the type of a vehicle. This first side rotary jig 24 comprises two pairs of bases 25, - - - ,25 provided separately along the longitudinal direction of the assembly line 1, each pair of bases 25, 25 being located at right and left sides of the assembly line 1. (FIGS. 1–5, 7, 8, 12 and 13 simply show only one base 25 provided at each side of the first temporary welding station S2 of the assembly line 1, but it represents two bases 25, 25 actually.) As illustrated in FIG. 6, each base 25 has an upper end supporting a shaft 27 parallel to the longitudinal direction of the assembly line 1. A plurality of (three in the disclosed embodiment) support arms 26, - - - , 26 are rotatably supported about this shaft 27. These plural support arms 26, - - - , 26 are differentiated in accordance with the type of a vehicle. Each arm 26, at a confronting position where it protrudes horizontally toward the assembly line 1, is stationarily fixed. A corresponding support arm 26, provided on its mating base 25 in an opposed relation to this support arm 26, cooperatively support the front body assembly W4.

Two polar-coordinate type welding robots 29, 29 are disposed behind the paired bases 25, 25 provided at right and left sides of the assembly line 1. Each welding robot 29 has a robot arm 29a whose distal end supports a welding gun 29b for spot welding the front body assembly W4.

More specifically, the front body assembly W4 clamped in position by the exclusive jigs 7, - - - ,7 on the exclusive carriage 3A (3B) is transported from the first part-supply station S1 to this first temporary welding station S2. Then, the welding robots 29, 29 of this first temporary welding station S2 perform temporary welding (i.e. temporary connection) on the front body assembly W4 clamped in position by the exclusive jigs 7, - - - ,7. The front body assembly W4 temporary welded in this manner is then raised by the lifter 8 and transferred onto the side rotary jig 24. Same type support arms 26, 26 of the mated bases 25, 25, protruding horizontally toward the assembly line 1, cooperatively support the front body assembly W4 in position. Subsequently, the welding robots 29, 29 further carry out power-increased spot welding (i.e. permanent connection) on thus positioned front body assembly W4. Meanwhile the exclusive carriage 3A (or 3B), empty at the moment after the front body assembly W4 is transferred onto the first side rotary jig 24, is immediately returned to the first part-supply station S1. Instead, the first common carriage 10A comes under the front body assembly W4. Then the front body assembly W4, being finished the power-increased spot welding, is lowered by the lifter 14 and laid on the first common carriage 10A. Thereafter the common parts, i.e. parts formed into the same configuration irrespective of the type of a vehicle, are respectively clamped by the common jigs 13, - - - ,13 on the first common carriage 10A.

First power-increased welding station S3

Like the first temporary welding station S2, the first power-increased welding station S3 includes the second side rotary jig 81 acting as a second positioning means for clamping parts of the front body assembly W4 in position, and a total of two welding robots 32, 32 disposed behind the bases 25, 25 of the second side rotary jig 31. The second side rotary jig 31 and the welding robots 32, 32 have the same construction as the first side rotary jig 24 and the welding robots 29, 29 of the first temporary welding station S1 (refer to FIG. 6). Therefore, identical parts are denoted by the same reference numerals and will not be explained again.

First, in this first power-increased welding station S3, the front body assembly W4 clamped in position by the common jigs 13, - - - ,13 on the first common carriage 10A is transported from the first temporary welding station S2 to this first power-increased welding station S3. The front body assembly W4 is then raised by the lifter 14 of the first common carriage 10A and transferred onto the second side rotary jig 31. Same type support arms 26, 26 of the paired bases 25, 25 of the second side rotary jig 31, protruding horizontally toward the assembly line 1, cooperatively support the front body assembly W4 in position. Subsequently, the welding robots 32, 32 carry out power-increased spot welding (i.e. permanent connection) on thus positioned front body assembly W4. Meanwhile the first common carriage 10A, empty at the moment after the front body assembly W4 is transferred onto the second side rotary jig 31, is immediately returned to the first temporary welding station S2. Instead, the second common carriage 10B comes under the front body assembly W4. Then the front body assembly W4, being finished the power-increased spot welding, is lowered by the lifter 14 onto the second common carriage 10B. Thereafter the common parts, i.e. parts formed into the same configuration irrespective of the type of a vehicle, are respectively held by the common jigs 13, - - - ,13 on the second common carriage 10B.

Second part-supplying station S4

In this second part-supplying station S4, like the first part-supplying station S1, the front body assembly W4 transported from the first power-increased welding station S3 by the second common carriage 10B is raised by the lifter 14 of the second common carriage 10B and transferred onto the third side rotary jig 46 having substantially the same construction as the first side rotary jig 24. Same type support arms 26, 26 of the paired bases 25, 25 of the third side rotary jig 46, protruding horizontally toward the assembly line 1, cooperatively support the front body assembly W4 in position. Meanwhile the second common carriage 10B, empty at the moment after the front body assembly W4 is transferred onto the third side rotary jig 46, is returned to the first power-increased welding station S3. Instead, the third or fourth exclusive carriage 3C or 3D comes under the front body assembly W4. Then the front body assembly W4, received by the lifter 8, is laid on the exclusive carriage 3C or 3D. Workers of the second part-supplying station S4 assemble the remaining parts of the under body W (i.e. the front and rear floor panels W5, W6, the rear end panel WT, and the front and rear side sills W8, W9) to set the under body W in position on the exclusive carriage 3C or 3D. Among these parts, exclusive parts differentiated in accordance with the type of a vehicle are clamped by the exclusive jigs 7, - - - ,7 on the jig base 6.

Second temporary welding station S5

The second temporary welding station S5 carries out substantially the same operation as the first temporary welding station S2. Namely, the second temporary welding station S5 includes the fourth side rotary jig 34 acting as a first positioning means and a total of two polar-coordinate type welding robots 35, 35 disposed behind the fourth side rotary jig 34. The fourth side rotary jig 34 and the welding robots 35, 35 have the same construction as the first side rotary jig 4 and the welding robots 29, 29 of the first temporary welding station S1 (refer to FIG. 6). Therefore, identical parts are denoted by the same reference numerals and will not be explained again.

In this second temporary welding station S5, the under body W clamped in position by the exclusive jigs 7, - - - ,7 on the exclusive carriage 3C (3D) is transported from the second part-supply station S4 to this second temporary welding station S5. Then, the welding robots 35, 35 of this second temporary welding station S5 perform temporary welding on the under body W clamped in position by the exclusive jigs 7, - - - ,7. The under body W temporary welded in this manner is then raised by the lifter 8 of the exclusive carriage 3C (or 3D) and transferred onto the fourth side rotary jig 34. Same type support arms 26, 26 of the mated bases 25, 25, disposed at both sides of the assembly line 1 and protruding horizontally toward the assembly line 1, cooperatively support the under body W in position. Subsequently, the welding robots 35, 35 further carry out power-increased spot welding on thus positioned under body W. Meanwhile the exclusive carriage 3C (or 3D), empty at the moment after the under body W is transferred onto the fourth side rotary jig 34, is immediately returned to the second part-supply station S4. Instead, the third common carriage 10C comes under the under body W. Then the under body W, being finished the power-increased spot welding, is lowered by the lifter 14 and laid on the third common carriage 10C. Thereafter the common parts, i.e. parts formed into the same configuration irrespective of the type of a vehicle, are respectively held by the common jigs 13, - - - ,13 on the third common carriage 10C.

Second power-increased welding station S6

Like the first power-increased welding station S3, this second permanent welding station S6 includes the fifth side rotary jig 37 acting as second positioning means for clamping parts of the under body W in position, and a total of two welding robots 38, 38 disposed behind the bases 25, 25 of the fifth side rotary jig 37. The fifth side rotary jig 37 and the welding robots 38, 38 have the same construction as the first side rotary jig 24 and the welding robots 29, 29 of the first temporary welding station S1 (refer to FIG. 6). Therefore, identical parts are denoted by the same reference numerals and will not be explained again.

In this second power-increased welding station S6, the under body W clamped in position by the common jigs 13, - - - ,13 on the third common carriage 10C is raised by the lifter 14 of the carriage 10C and transferred onto the fifth side rotary jig 37. Same type support arms 26, 26 of the paired bases 25, 25 of the fifth side rotary jig 37, protruding horizontally toward the assembly line 1, cooperatively support the under body W in position. Subsequently, the welding robots 38, 38 carry out power-increased spot welding on thus positioned under body W. Meanwhile the third common carriage 10C, empty at the moment after the under body W is transferred onto the fifth side rotary jig 37, is immediately returned to the second temporary welding station S5. Instead, the fourth common carriage 10D comes under the under body W. Then the under body W, being finished the power-increased spot welding, is lowered by the lifter 14 and laid on the fourth common carriage 10D. Thereafter the common parts, i.e. parts formed into the same configuration irrespective of the type of a vehicle, are respectively clamped by the common jigs 13, - - - ,13 on the fourth common carriage 10D.

Third power-increased welding station S7

Like the second power-increased welding station S6, this third power-increased welding station S7 includes the sixth side rotary jig 40 acting as a second positioning means for clamping parts of the under body W in position, and a total of two welding robots 41, 41 disposed behind the bases 25, 25 of the sixth side rotary jig 40. The sixth side rotary jig 40 and the welding robots 41, 41 have the same construction as the first side rotary jig 24 and the welding robots 29, 29 of the first temporary welding station S1 (refer to FIG. 6). Therefore. identical parts are denoted by the same reference numerals and will not be explained again.

In this third power-increased welding station S7, the under body W clamped in position by the common jigs 13, - - - ,13 on the fourth common carriage 10D is raised by the lifter 14 of the carriage 10D and transferred onto the sixth side rotary jig 40. Same type support arms 26, 26 of the paired bases 25, 25 of the sixth side rotary jig 40, protruding horizontally toward the assembly line 1, cooperatively support the under body W in position. Subsequently, the welding robots 41, 41 carry out power-increased spot welding on thus positioned under body W. Meanwhile the fourth common carriage 10D, empty at the moment after the under body W is transferred onto the sixth side rotary jig 40, is immediately returned to the second power-increased welding station S6.

Figure 3:
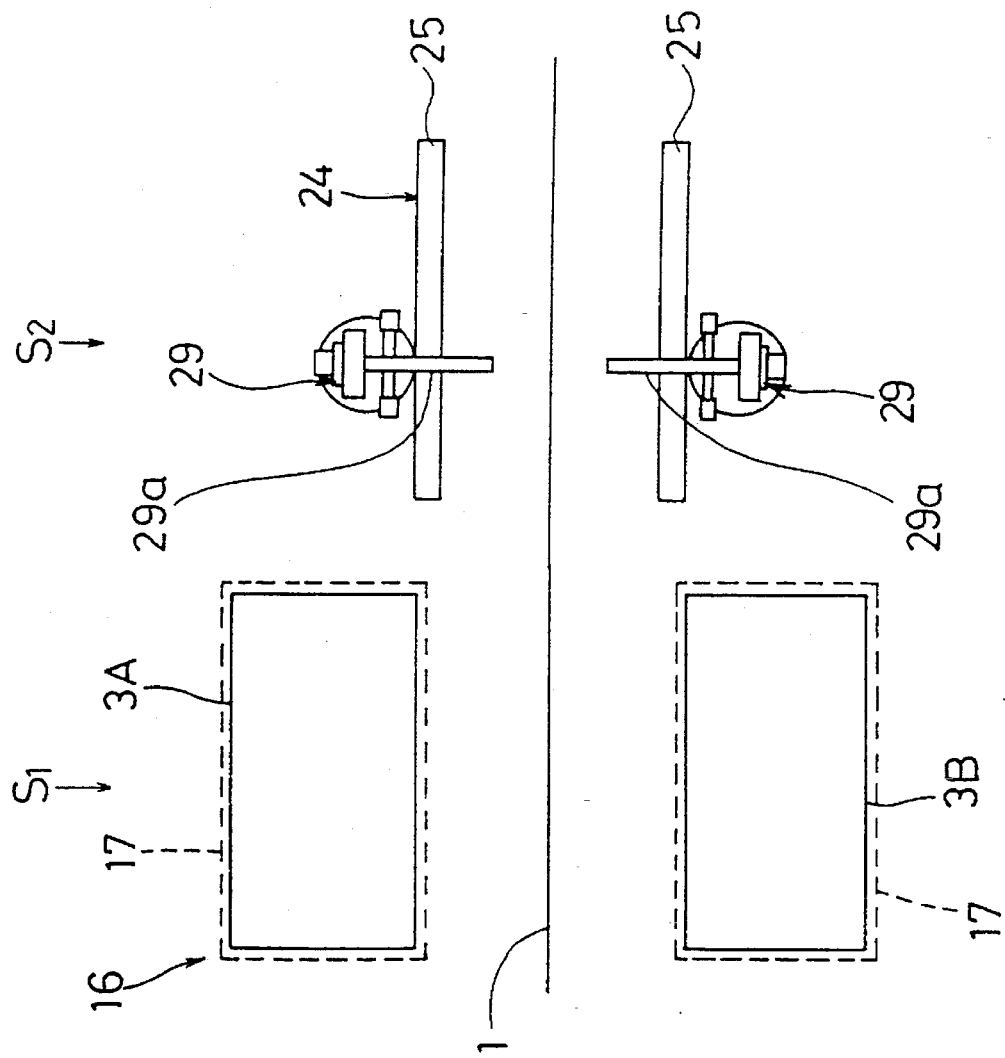
FIG. 3 is a plan view schematically showing an operation-starting condition of the first part-supplying station and the first temporary welding station in the vehicle body assembly line.

Next, an operation of the above-described embodiment will be explained. In the beginning of the operation, the first and the second exclusive carriages 3A and 3B are located in the carriage containers 17, 17 of the first carriage supply apparatus 16, as shown in FIG. 3. On the other hand, the third and fourth exclusive carriages 3C and 3D are located in the carriage containers 21, 21 of the second carriage supply apparatus 20. The first common carriage 10A is located between the first temporary welding station S2 and the first power-increased welding station S3. The second common carriage 10B is located between the first power-increased welding station S3 and the second part-supplying station S4. Furthermore, the third common carriage 10C is located in the second power-increased station S6, and the fourth common carriage 10D is located in the third power-increased station S7.

Figure 4:
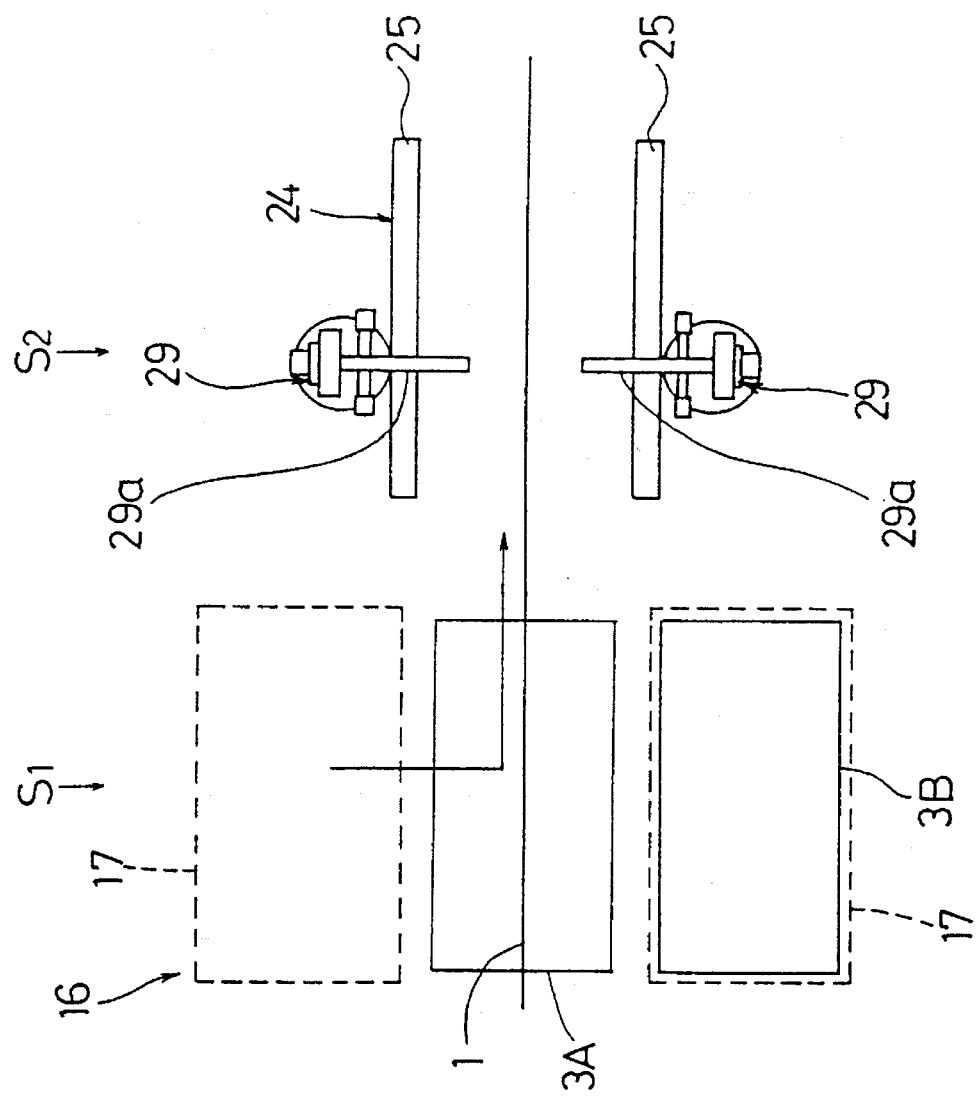
FIG. 4 is a plan view, equivalent to FIG. 3, schematically showing a condition where the first exclusive carriage is transported into the first part-supplying station.

It is now assumed that the first and the third exclusive carriages 3A and 3C are selected in accordance with the type of a vehicle (i.e. under body W) to be assembled. First, as illustrated in FIG. 4, the first exclusive carriage 3A is transported from its carriage container 17 into the assembly line 1 via the access rails 18, 18, and is placed in position in the first part-supply station S1. The workers of this first part-supply station S1 supply the first exclusive carriage 3A with the parts constituting the front body assembly W4 shown in FIG. 11(a). Among these parts, the exclusive parts differentiated in accordance with the type of a vehicle are clamped by the exclusive jigs 7, - - - ,7 on the jig base 6 of the exclusive carriage 3A.

Figure 5:
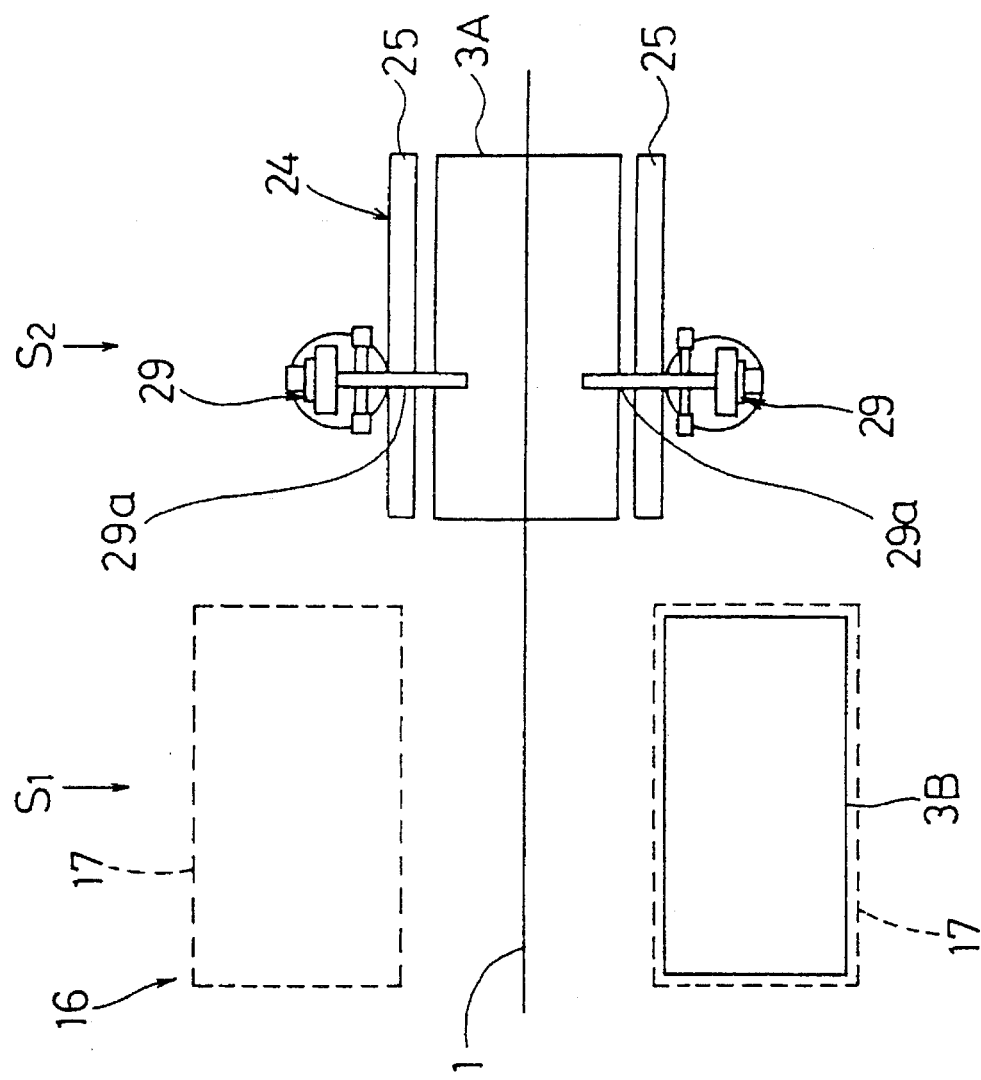
FIG. 5 is a plan view, equivalent to FIG. 8, schematically showing a condition where the first exclusive carriage is transported into the first temporary welding station.
Figure 6:
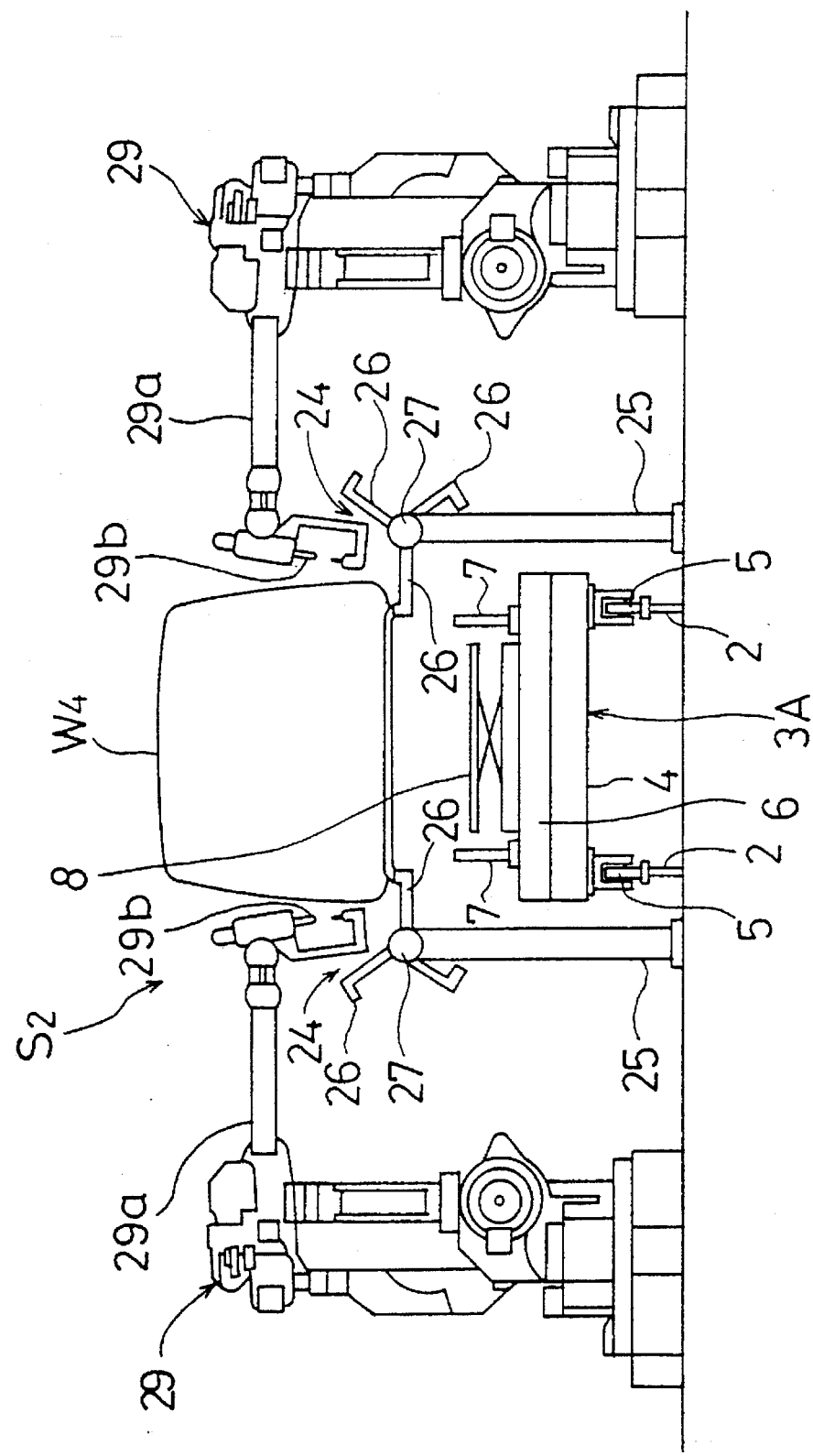
FIG. 6 is a side view showing a condition where the first exclusive carriage is transported into the first temporary welding station.

Thereafter, as illustrated in FIG. 5, the exclusive carriage 3A clamping the front body assembly W4 by means of the exclusive jigs 7, - - - ,7 is transported to the first temporary welding station S2. In the first temporary welding station S2, the front body assembly W4 camped in position by the exclusive jigs 7, - - - ,7 is temporarily welded by the welding robots 29, 29. After finishing this temporary welding, the exclusive jigs 7, - - - ,7 are unclamped. Subsequently, as illustrated in FIG. 6, the front body assembly W4 is raised by the lifter 8 of the exclusive carriage 3A and transferred onto the first side rotary jig 24 disposed along the assembly line 1. The same type support arms 26, 26 corresponding to the type of the front body assembly W4 support this front body assembly W4 in position at both sides of the assembly line 1. Namely, the front body assembly W4 temporarily welded is taken out from the exclusive carriage 3A, and supported in position between the support arms 26, 26 of the first side rotary jig 24. Keeping this condition, the front body assembly W4 is applied the power-increased spot welding by the welding robots 29, 29.

As described above, the front body assembly W4 is transferred from the first exclusive carriage 3A to the side rotary jig 24 and supported in position for applying the power-increased welding using the welding robots 29, 29. This transfer operation is effective to facilitate the power-increased welding using the welding robots 29, 29 compared with a conventional operation wherein the power-increased welding is directly applied on the front body assembly W4 laid on the exclusive carriage 3A. Because, interference of the welding robots 29, 29 with parts or other members on the exclusive carriage 3A can be surely prevented by supporting the front body assembly W4 far above the carriage 3A.

Furthermore, the exclusive carriage 3A becoming empty is immediately returned to the first part-supplying station S1 after the front body assembly W4 is taken out from the exclusive carriage 3A and supported in position between the support arms 26, 26 of the first side rotary jig 24. Accordingly, the exclusive carriage 3A does not give any adverse effect to the power-increased welding of the front body assembly W4 at the first temporary welding station S2, thereby further facilitating the power-increased welding operation.

After the empty exclusive carriage 3A is returned to the first part-supplying station S1, the first common carriage 10A located between the first temporary welding station S2 and the first power-increased station S3 is transported to the first temporary welding station S2. Then, the front body assembly W4 is received by the lifter 14 and lowered from the first side rotary jig 24 onto the first common carriage 10A. And, the common parts are clamped by the common jigs 13, - - - , 13.

After that, the first common carriage 10A carrying the front body assembly W4 shifts to the first power-increased station S3. At this first power-increased station S3, the front body assembly W4 is raised by the lifter 14 of the first common carriage 10A and transferred onto the second side rotary jig 31, and then supported in position between the arms 26, 26 disposed at both sides of the assembly line 1. With this positioning condition, the welding robots 32, 32 perform the power-increased spot welding. Meanwhile, the empty first common carriage 10A is returned from the first power-increased welding station S3 to the first temporary welding station S2. Instead, the second common carriage 10B comes in the first power-increased welding station S3.

As described above, the empty common carriage 10A is immediately returned to the first temporary welding station S2 after the front body assembly W4 is transferred onto the second side rotary jig 31. This is effective to facilitate the power-increased spot welding using the welding robots 32, 32 at the first power-increased station S3.

Next, the second common carriage 10B carrying the front body assembly W4 is transported to the second part-supplying station S4. In this second part-supplying station S4, the front body assembly W4 transported from the first power-increased welding station S3 by the second common carriage 10B is raised by the lifter 14 of the second common carriage 10B and transferred onto the third side rotary jig 46, and then supported in position by the support arms 26, 26 disposed at both sides of the assembly line 1. Meanwhile the second common carriage 10B becoming empty shifts and stops in a waiting region between the first power-increased station S3 and the second part-supplying station S4. Instead, the third exclusive carriage 3C located in the carriage container 21 of the second carriage supply apparatus 20 is transported into the assembly line 1 via the access rails 22, 22, and is placed in position in the second part-supply station S4.

Then the front body assembly W4, received by the lifter 8, is transferred from the third side rotary jig 46 onto the third exclusive carriage 3C and clamped by the exclusive jigs 7, - - - , 7.

Subsequently, the workers of the second part-supplying station S4 supply the third exclusive carriage 3C with the remaining parts of the under body W (i.e. the front and rear floor panels W5, W6, the rear end panel W7, and the front and rear side sills W8, W9) and assemble these new parts with the front body assembly W4. Thus, the under body W is entirely set and is clamped in position by the exclusive jigs 7, - - - ,7 in accordance with the type of a vehicle.

After finishing the assembling of the additional parts, the third exclusive carriage 3C carrying the under body W is shifted from the second part-supplying station S4 to the second temporary welding station S5. In this second temporary welding station S5, the under body W clamped in position by the exclusive jigs 7, - - - ,7 on the exclusive carriage 3C is temporarily welded by the welding robots 35, 35. The under body W temporary welded in this manner is then raised by the lifter 8 of the exclusive carriage 3C and transferred onto the fourth side rotary jig 34. Same type support arms 26, 26 of the fourth side rotary jig 34 cooperatively support the under body W in position. Subsequently, the welding robots 35, 35 further carry out the power-increased spot welding on thus positioned under body W.

Meanwhile the empty third exclusive carriage 3A is immediately returned to the second part-supply station S4. Instead, the third common carriage 10C comes in the second temporary welding station S5. Then the under body W is lowered by the lifter 14 from the side rotary jig 34 onto the third common carriage 10C. Thereafter the common parts are respectively clamped by the common jigs 13, - - - ,13 on the third common carriage 10C.

Next, the third common carriage 10C carrying the under body W is transported from the second temporary welding station S5 to the second power-increased station S6. In this second power-increased welding station S6, like the first power-increased welding station S3, the under body W clamped in position by the common jigs 13, - - - ,13 on the third common carriage 10C is raised by the lifter 14 of the carriage 10C and transferred onto the fifth side rotary jig 37. Same type support arms 26, 26 of the fifth side rotary jig 37 cooperatively support the under body W in position. Subsequently, the welding robots 38, 38 carry out the power-increased spot welding on thus positioned under body W. Meanwhile the empty third common carriage 10C is immediately returned from the second power-increased welding station S6 to the second temporary welding station S5. Instead, the fourth common carriage 10D comes in the second power-increased welding station S6. Then the under body W, being finished the power-increased spot welding, is lowered by the lifter 14 onto the fourth common carriage 10D.

After that, the fourth common carriage 10D carrying the under body W is shifted from the second power-increased welding station S6 to the third power-increased welding station S7. In this third power-increased welding station S7, like the second power-increased welding station S6, the under body W clamped in position by the common jigs 13, - - - ,13 on the fourth common carriage 10D is raised by the lifter 14 of the carriage 10D and transferred onto the sixth side rotary jig 40. Same type support arms 26, 26 of the sixth side rotary jig 40 cooperatively support the under body W in position. Subsequently, the welding robots 41, 41 carry out the final power-increased spot welding on thus positioned under body W. Thus, the assembling of the under body W is accomplished. And, the under body W is taken out from the side rotary jig 40 of the second power-increased welding station S7 and is conveyed out of the assembly line 1. The fourth common carriage 10D, becoming empty in the third power-increased welding station S7, is returned from the third power-increased welding station S7 to the second power-increased welding station S6.

Figure 7:
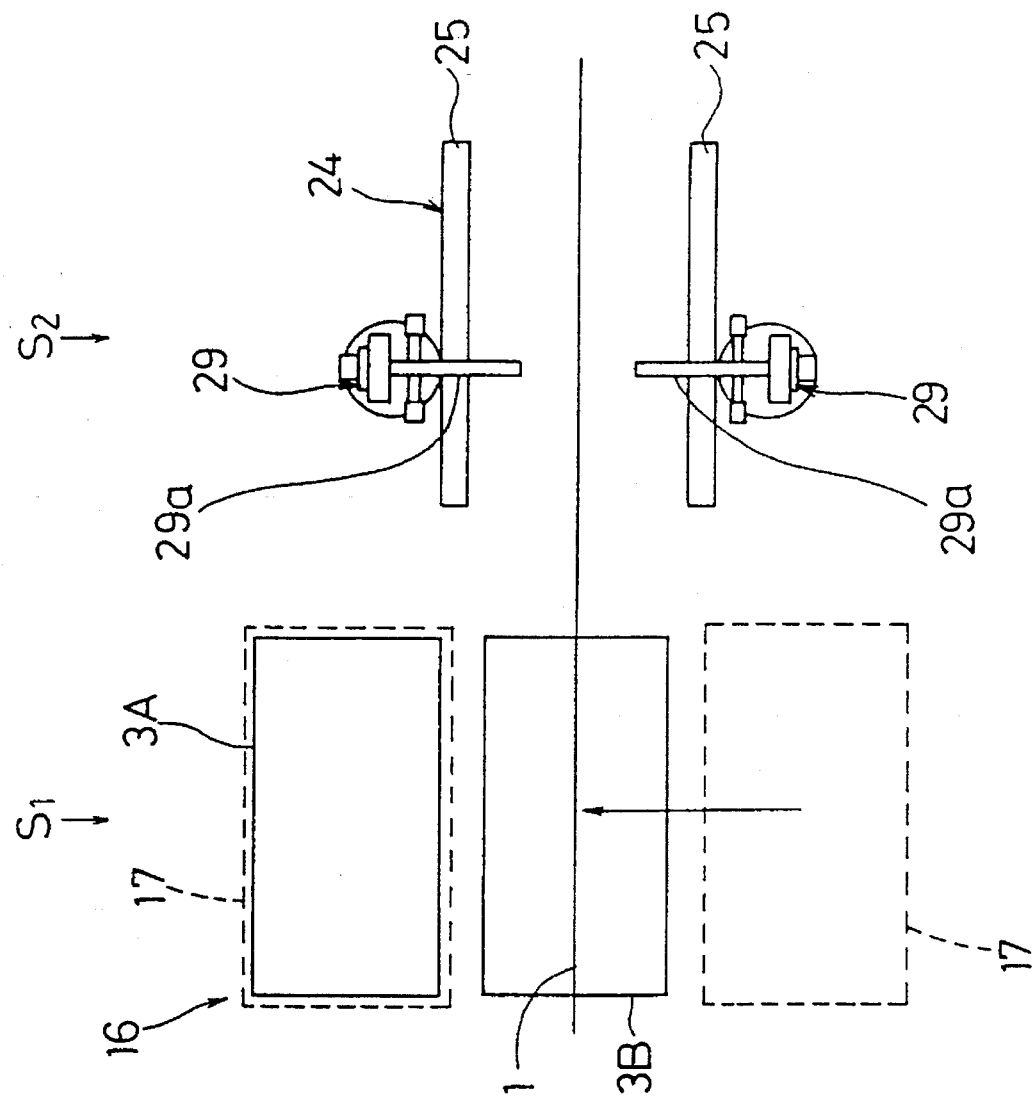
FIG. 7 is a plan view, equivalent to FIG. 8, schematically showing a condition where the first exclusive carriage is exchanged for the second exclusive carriage.
Figure 8:
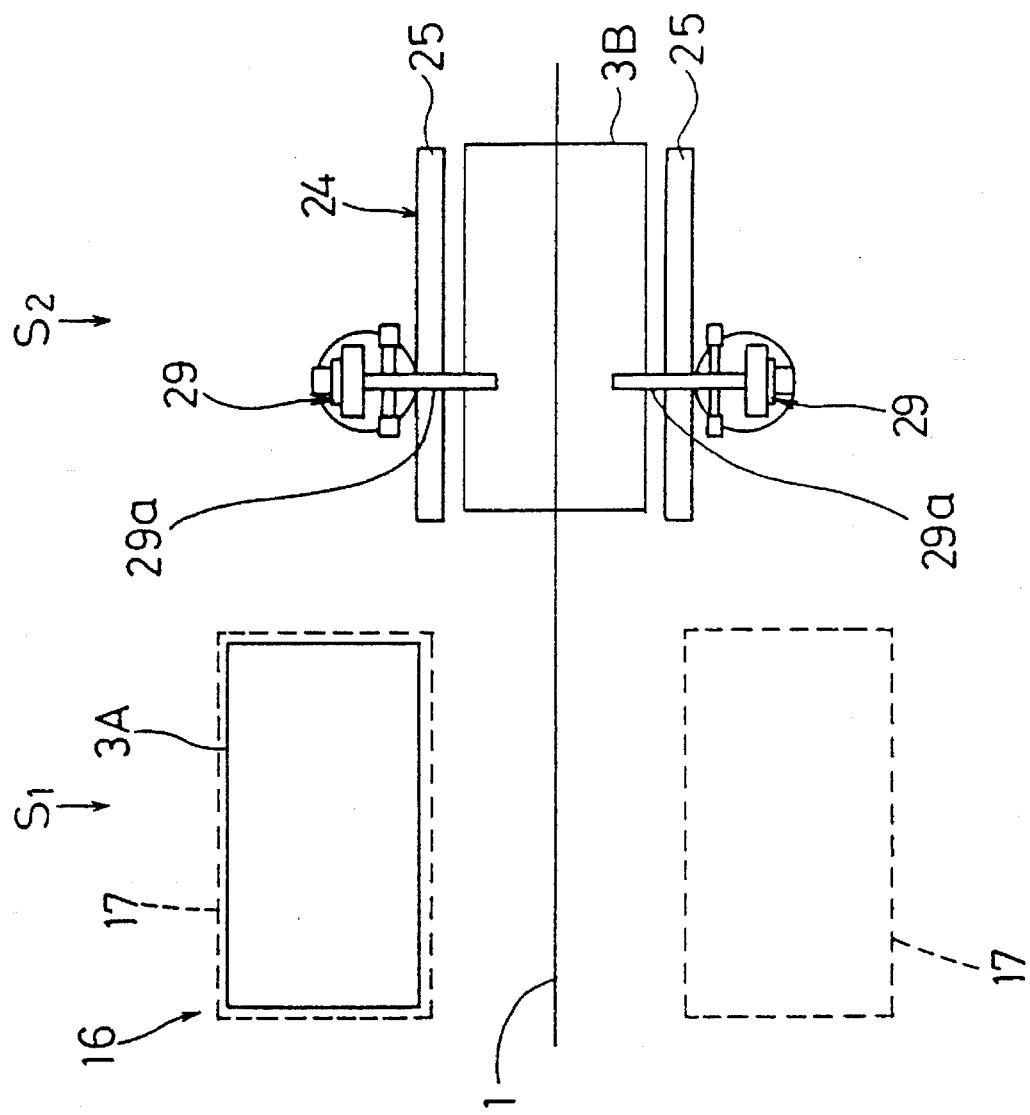
FIG. 8 is a plan view, equivalent to FIG. 3, schematically showing a condition where the second exclusive carriage is transported into the first part-supplying station.

On the contrary, the second and fourth exclusive carriages 3B and 3D are selected in response to the change of the type of the under body W to be assembled. However, the operations of the first to fourth common carriages 10A–10D are the same. As illustrated in FIG. 7, the first exclusive carriage 3A having been previously used is returned to the empty carriage container 17 of the first carriage supply apparatus 16 via the first part-supplying station S1, after the first exclusive carriage 3A becomes empty in the first temporary welding station S2. Then, the first exclusive carriage 3A is replaced with the second exclusive carriage 3B in the carriage supply apparatus 16. The second exclusive carriage 3B is then transported into the first part-supplying station S1 as shown in FIG. 8. Then, the front body assembly W4 of another type of under body W is supplied and clamped in position by means of the exclusive jigs 7, - - - ,7.

Meanwhile the third exclusive carriage 3A, after becoming empty at the second temporary welding station S5, is returned to the empty carriage container 21 of the second carriage supply apparatus 20 via the second part-supplying station S4. Then, the third exclusive carriage 3C is replaced with the fourth exclusive carriage 3D in the carriage supply apparatus 20. Then the operations are repeated in the same manner as described above.

Accordingly, when the two types of under bodies W, W are assembled by spot welding, the present embodiment only requires exchanging the exclusive carriages 3A–3D and switching the support arms 26, 26 of each of the side rotary jigs 24, 31, 46, 34, 37 and 40 in accordance with change of the type of a vehicle in the temporary welding stations S2, S5 and the power-increased stations S3, S6 and S7, thereby largely reducing time and manpower required for changing the type of the under body W. Easiness of exchanging the exclusive carriages 3A–3D in response to the change of the type of the under body W can eliminate the production of lots for production of two kinds of under bodies W, W, and therefore can assure an excellent efficiency in the mixed production of a plurality of under bodies W, - - -, W in one assembly line 1.

Moreover, the first or second exclusive carriage 3A or 3B causes a reciprocative movement between the first part-supplying station S1 and the first temporary welding station S2. Similarly, the first common carriage 10A causes a reciprocative movement between the first temporary welding station S2 and the first power-increased welding station S3. The second common carriage 10B causes a reciprocative movement between the first power-increased welding station S3 and the second part-supplying station S4. The third or fourth exclusive carriage 3C or 3D causes a reciprocative movement between the second part-supplying station S4 and the second temporary welding station S5. The third common carriage 10C causes a reciprocative movement between the second temporary welding station S5 and the second power-increased welding station S6. And, the fourth common carriage 10D causes a reciprocative movement between the second and the third power-increased welding stations S6 and S7. Such a reciprocative movement realized in each of the carriages 3A–3D and 10A–10D can completely eliminate the circulation type transportation system. Thus, a mixed assembly line capable of assembling at least two kinds of under bodies W, W can be realized with small installation space. It will bring a significant cost down.

Furthermore, the present embodiment carries out the temporary welding of the front body assembly W4 and the under body W by clamping them with the exclusive jigs 7, - - - ,7 on respective exclusive carriages 3A–3D and subsequently carries out the power-increased welding of the front body assembly W4 and the under body W by supporting them in position between the support arms of side rotary jigs 24, 34, 46, 31, 37 and 40 in the temporary welding stations S2, S5 and the power-increased stations S3, S6 and S7. Lifting and supporting the front body assembly W4 and the under body W far above the exclusive jigs 7, - - - ,7 of the carriages 3A–3D is advantageous to prevent the welding robots from interfering with the complicated exclusive jigs 7, - - - ,7 during the power-increased welding operation. On the contrary, if the power-increased welding is carried out in a conventional condition where the front body assembly W4 and the under body W are laid on the exclusive carriages 3A–3D, it will encounter with the above-described interference. Thus, the present embodiment enables the same assembly line to perform the temporary and power-increased welding of the front body assembly W4 and the under body W without causing any interference, thus generalizing all the steps of the assembling of the under body W.

Moreover, each of the first to fourth exclusive carriages 3A–3D and the first to fourth common carriages 10A–10D includes the filter 8 or 14 for raising or lowering the front body assembly W4 or the under body W. This makes it easy to transfer the front body assembly W4 and the under body W from respective carriages 3A–3D and 10A–10D to the side rotary jigs 24, 34, 46, 31, 37 and 40 in the temporary welding stations S2, S5 and the power-increased stations S3, S6 and S7, as well as return the front body assembly W4 and the under body W from the side rotary jigs 24, 34, 46, 31, 37 and 40 to the carriages 3A–3D and 10A–10D.

Still further, the present embodiment provides the assembly line 1 with a total of two station groups each combining the part-supplying station S1 (S4), the temporary welding station S2 (or S5), and the power-increased welding station S3 (or S6, S7). Accordingly, numerous parts constituting the under body W can be separated into two groups, one for the first part-supplying station S1 and the other for the second part-supplying station S4. Thus, the front body assembly W4, which is a part of the under body W, can be first assembled and then the remaining parts (i.e. the front and rear floor panels WS, W6, the rear end panel W7, and the front and rear side sills WS, W9) are added to thus completed front body assembly W4. Such a divided assembling method will simplify the overall welding operation.

Although the above-described embodiment shows a mixed production of two types of under bodies W, W, it is needless to say that the present invention can be applied to a mixed production assembling not less than three types of under bodies. In such a case, the carriage containers will be required the same number as the number of types of the under bodies.

Although the above-described embodiment provides the assembly line 1 with a total of two station groups each combining the part-supplying station S1 (S4), the temporary welding station S2 (or S5), and the power-increased welding station S3 (or S6, S7), the number of the station groups can be increased in response to the increase of parts or, on the contrary, reduced to only one station group in response to reduction of the number of parts.

Yet further, the carriage supply apparatus 16 (or 20) for supplying the assembly line 1 with the exclusive carriages 3–3D is not limited to the carriage containers 17, 17 (or 21, 21) disclosed in the above-described embodiment. For example, the one disclosed in FIG. 12, or FIG. 18 or FIG. 14 can be adopted. Namely, each of these drawings shows a modification of the carriage supply apparatus (although each drawing only shows the construction of the first carriage supply apparatus 16, it should be noted that this construction can be equally applied to the second carriage supply apparatus 20). The first carriage supply apparatus shown in FIG. 12 includes a turning table 43 provided at a portion upstream of the first part-supplying station S1 of the assembly line 1. On this turning table 43, a plurality of (four in the drawing) carriage containers 17, - - - ,17 respectively containing the exclusive carriages 3A, 3B, 3E and 3F different from each other are disposed equally spaced in the circumferential direction. By turning the turning table 43, one carriage container 17 is positioned at a portion meeting the assembly line 1, thereby selectively supplying the assembly line 1 with the exclusive carriage 3A (or 3B, 3E, 3F) of the carriage containers 17,—,17.

Figure 13:
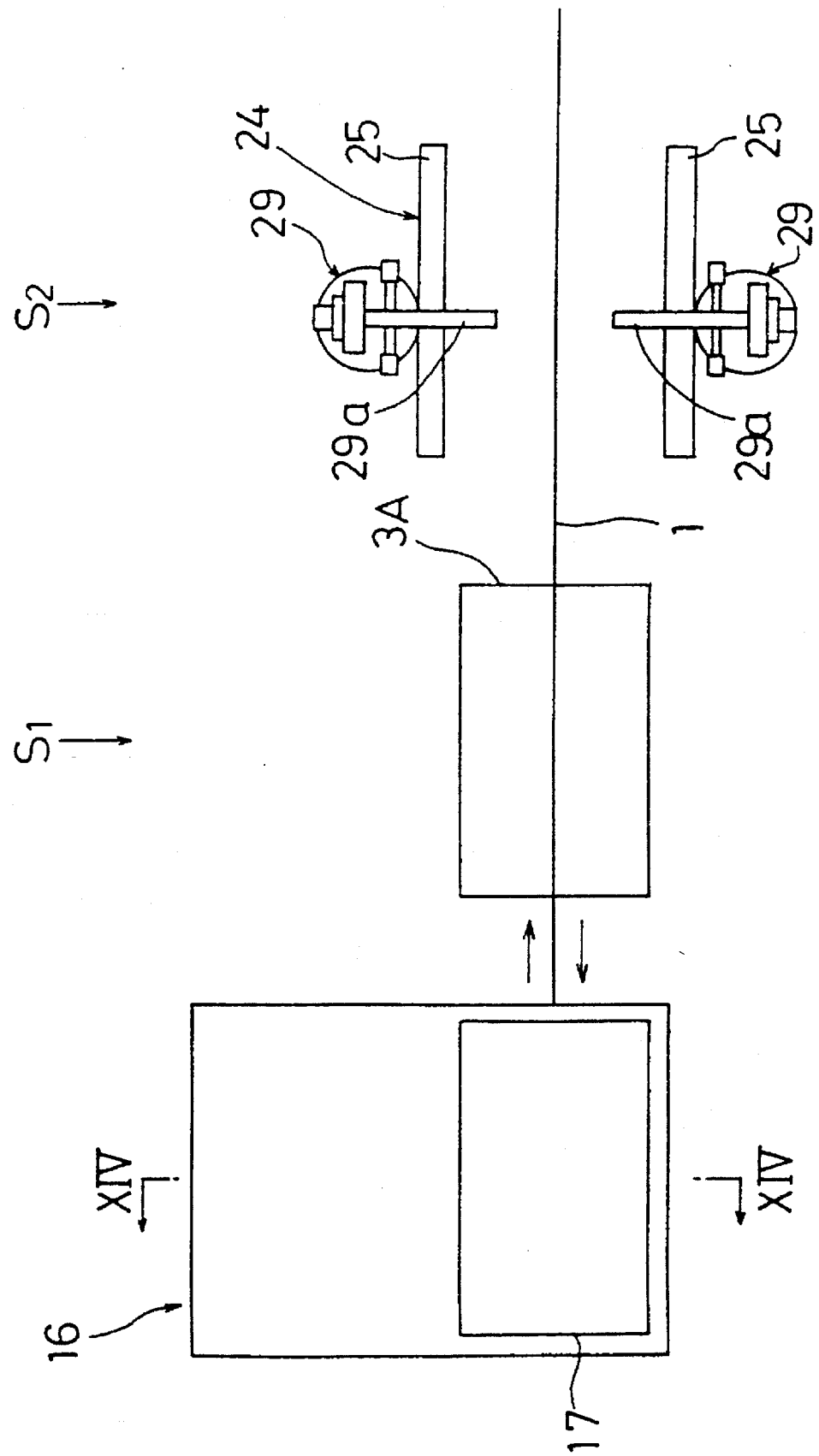
FIG. 13 is a plan view schematically showing another modification of the carriage supply apparatus.
Figure 14:
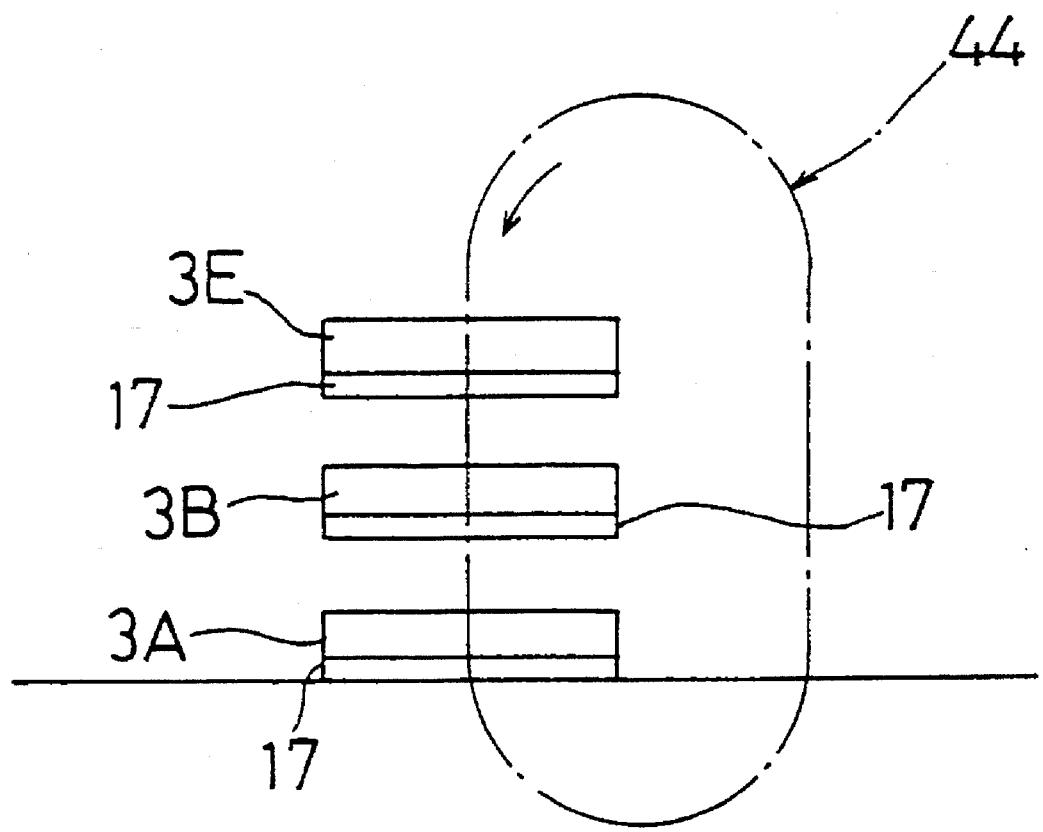
FIG. 14 is a cross-sectional view taken along a line XIV—XIV of FIG. 13.

On the other hand, the carriage supply apparatus 16 shown in FIGS. 13 and 14 includes an elevation mechanism 44 provided at a portion upstream of the first part-supplying station S1 of the assembly line 1. This elevation mechanism 44 supports a plurality of (three in the drawing) carriage containers 17, - - - , 17 vertically arranged and shiftable along a guide and respectively containing the exclusive carriages 3A, 3B, 3E different with each other. By shifting the carriage containers 17, - - - ,17 in the vertical direction, one carriage container 17 is positioned at a height meeting the assembly line 1, thereby selectively supplying the assembly line 1 with the exclusive carriage 3A (or 3B, 3E) of the carriage containers 17, - - - ,17. Accordingly, these modified carriage supply apparatuses 16, 16 can bring the same effect as the above-described embodiment.

Although the above-described embodiment is based on the assembly line of the under body W of an automotive vehicle, it is needless to say that the present invention can be applied to other assembly lines of other products.

As this invention may be embodied in several forms without departing from the spirit of essential characteristics thereof, the present embodiments as described are therefore intended to be only illustrative and not restrictive, since the scope of the invention is defined by the appended claims rather than by the description preceding them and all changes that fall within the metes and bounds of the claims, or equivalents of such metes and bounds, are therefore intended to be embraced by the claims.

What is claimed is:

1. An assembling method for assembling plural types of products by using carriages travelling on an assembly line, said assembling method comprising steps of:

preparing plural types of exclusive carriages differentiated in accordance with product type, each including exclusive jigs clamping parts constituting a product in position for temporary connection, and at least one common carriage including common jigs having common configuration irrespective of product type;

using a carriage supply apparatus for conveying one of said plural types of exclusive carriages to a part-supplying station of the assembly line;

supplying parts of a product onto said one of plural types of exclusive carriages and using the exclusive jigs for clamping parts supplied;

transporting the exclusive carriage to a temporary connecting station and temporarily connecting the parts, and subsequently transferring the parts from the exclusive carriage to a first positioning means and supporting the parts in position for permanent connection;

connecting a part of the parts permanently, and then transferring the parts from the first positioning means onto the common carriage and clamping the parts by means of the common jigs; and transporting the common carriage to at least one permanent connecting station wherein the parts are transferred from the common carriage to a second positioning means and clamping the parts in position for completing the permanent connection of the parts.

2. An assembling method in accordance with claim 1, wherein said product is a vehicle body or vehicle body parts.

3. An assembling apparatus for assembling plural types of products by using carriages travelling on an assembly line, said assembling apparatus comprising:

plural types of exclusive carriages differentiated in accordance with product type, each including exclusive jigs clamping parts constituting a product in position for temporary connecting;

at least one common carriage including common jigs having common configuration irrespective of product type;

carriage supply means for transporting one of said plural types of exclusive carriages to the assembly line;

a part-supplying station, disposed in the assembly line, for supplying parts to the exclusive carriage conveyed by said carriage supply means, and clamping the parts in position by means of the exclusive jigs;

a temporary connecting station disposed downstream of said part-supplying station in the assembly line and having a first positioning means for supporting the parts in position, said temporary connecting station temporarily connecting the parts clamped in position on said exclusive carriage and transferring temporarily welded parts from the exclusive carriage to said first positioning means to execute partial permanent connection of the parts, and thereafter transferring the parts from the first positioning means to the common carriage to clamp the parts in position by means of the common jigs; and at least one permanent connecting station disposed downstream of said temporary connecting station in the assembly line and having a second positioning means for supporting the parts in position, said permanent connecting station transferring the parts from the common carriage to said second positioning means to complete permanent connection of the parts.

4. An assembling apparatus in accordance with claim 3, wherein said exclusive carriage returns to the part-supplying station immediately after the parts temporarily connected in the temporary connection station is transferred onto the first positioning means, while said common carriage returns to a station located upstream of the permanent connecting station immediately after the parts permanently connected in the permanent connecting station is transferred onto the second positioning means.

5. An assembling apparatus in accordance with claim 3, wherein said carriage supply means has a plurality of carriage containers accommodating plural types of exclusive carriages and disposed along the assembly line, and said carriage supply means selectively supplies the assembly line with any one of the exclusive carriages from its corresponding carriage container.

6. An assembling apparatus in accordance with claim 3, wherein said carriage supply means has a turning table on which a plurality of carriage containers accommodating plural types of exclusive carriages are disposed in a circumferential direction, and said carriage supply means turns the turning table so that one carriage container is located at a position meeting the assembly line, thereby supplying one exclusive carriage from its carriage container to the assembly line.

7. An assembling apparatus in accordance with claim 3, wherein said carriage supply means has an elevation means supporting a plurality of carriage containers accommodating plural types of exclusive carriages shiftable in a vertical direction, and said carriage supply means causes said elevation means to vertically shift the carriage containers so that one carriage container is positioned at a height meeting the assembly line, thereby supplying one exclusive carriage from its carriage container to the assembly line.

8. An assembling apparatus in accordance with claim 3, wherein said positioning means includes support bases standing at both sides of the assembly line, each support base having a top provided with a shaft parallel to a longitudinal direction of the assembly line, said shaft rotatably supporting plural types of support arms configured differently in accordance with product type, wherein same type support arms of said support bases disposed at both sides of the assembly line are fixed in a confronting position protruding horizontally toward the assembly line, and cooperatively support the product in position.

9. An assembling apparatus in accordance with claim 8, wherein said exclusive carriages and said common carriage are equipped with a lifter for raising the parts laid on the carriage up to a height of the support arms of said positioning means.

10. An assembling apparatus in accordance with claim 3, wherein said product is a vehicle body or vehicle body parts.

11. An assembling apparatus in accordance with claim 10, wherein connection of the vehicle body or vehicle body parts are carried out by using a welding robot.

12. An assembling apparatus in accordance with claim 3, wherein a plurality of station groups each combining the part-supplying station, the temporary connecting station and the permanent connecting station are provided in the assembly line.

* * * * *